May 18, 1937. T. I. DUFFY 2,080,658
BICYCLE SADDLE AND MOUNTING THEREFOR
Filed Aug. 2, 1935
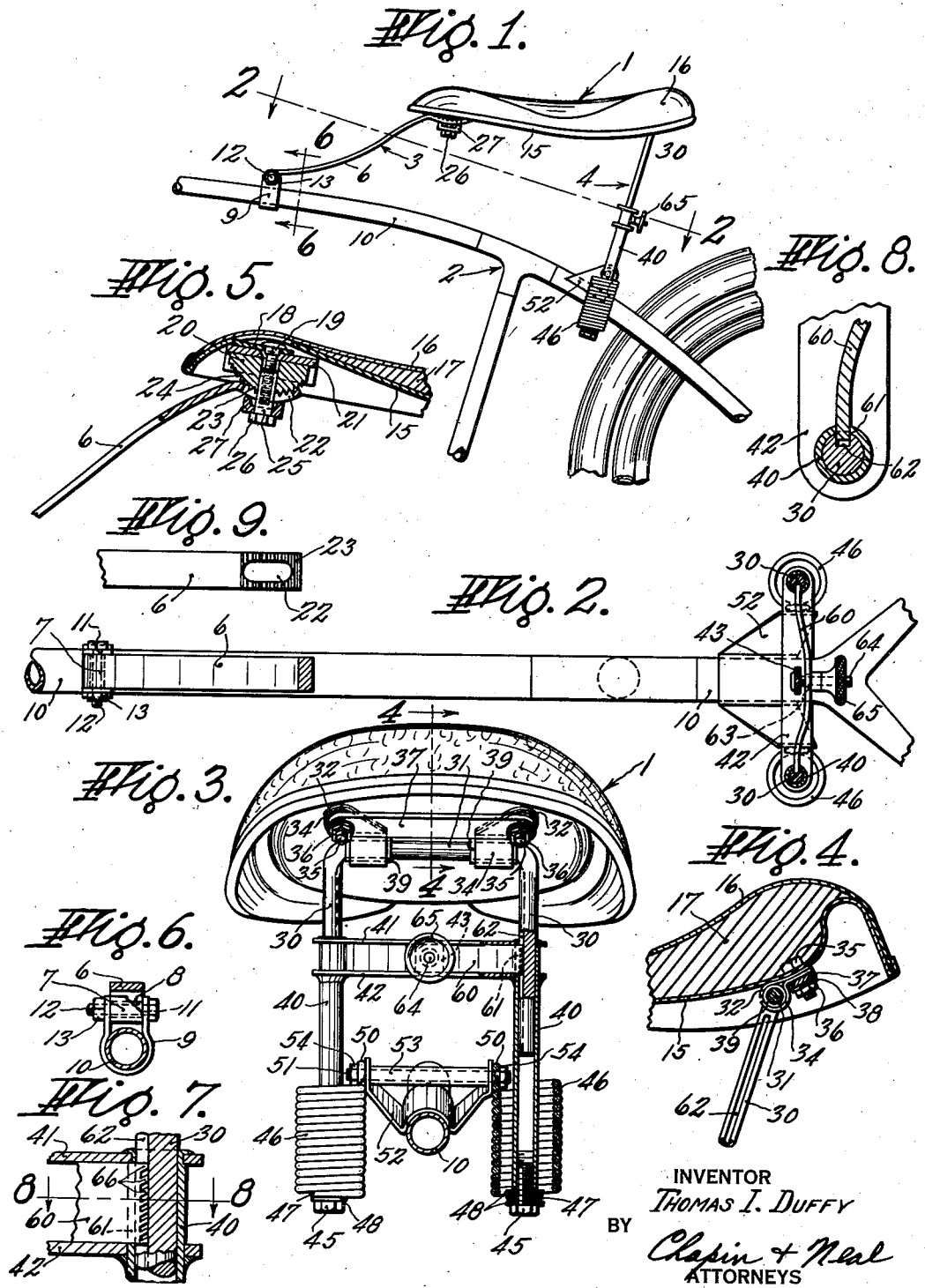
INVENTOR
Thomas I. Duffy
BY
Chapin + Neal
ATTORNEYS Patented May 18, 1937

2,080,658

UNITED STATES PATENT OFFICE 2,080,658

BICYCLE SADDLE AND MOUNTING THEREFOR

Thomas I. Duffy, Detroit, Mich., assignor to The Westfield Manufacturing Company, Westfield, Mass., a corporation of Massachusetts Application August 2, 1935, Serial No. 34,372

3 Claims. (Cl. 208—100)

This invention relates to saddles for bicycles and the like, including means for securing them to the vehicle frame.

The broad object is to improve the riding qualities in a bicycle. Among the other objects of the invention is to provide a saddle and mounting affording greater riding comfort coupled with greater security of attachment to the vehicle frame. Another object is to provide a greater range of adjustment of the saddle to accommodate the needs of the rider and to facilitate the making of such adjustments. Other and further objects residing in certain details of the construction will be made apparent in the following specification and claims.

In the accompanying drawing,

Fig. 1 is a side elevational view showing part of a bicycle frame with the saddle mounted thereon, all in accordance with this invention;

Fig. 2 is a sectional view, on a larger scale, substantially on line 2—2 of Fig. 1;

Fig. 3 is a rear view of the saddle and mounting of Fig. 1 on a larger scale and partly in section;

Fig. 4 is a sectional view of the rear portion of the saddle and associated mounting members substantially on line 4—4 of Fig. 3;

Fig. 5 is a similar sectional view of the front portion of the saddle;

Fig. 6 is a sectional view, on a larger scale, substantially on line 6—6 of Fig. 1;

Fig. 7 is a detail sectional view of one of the adjustable clamps;

Fig. 8 is a sectional view substantially on line 8—8 of Fig. 7 showing the parts in released position; and Fig. 9 is a detail plan view of one of the adjusting surfaces.

Referring to the drawing, the saddle, generally indicated at 1, as shown attached to the frame 2 of the bicycle by mountings 3 and 4 connected respectively to the front and rear ends of the saddle.

The front mounting comprises a bar, or relatively stiff leaf spring member 6, the forward end of which is bent as at 7 around a cylindrical bushing member 8 (see Fig. 6). The bent end of the member 6 is received between the upstanding ends of a U-shaped clamp 9 which embraces the top bar 10 of the bicycle frame 2. The end portions of clamp 9 are provided with apertures 11 aligning with the ends of bushing 8, and a bolt 12, extending through the apertures in the clamp and through bushing 8, serves by means of nut 13 threaded thereon, to hinge the forward end of the bar 6 to the clamp. Clamp 9 may be welded to the frame member 10 or may be held to the latter by bolt 12. If preferred, the forward end of the bar 6 may be clamped rigidly to the frame, relying on spring action in the bar to permit movement of the saddle with respect to the point of connection.

The saddle 1 is formed by a shaped metal plate 15 provided with a cover 16, formed of leather or the like. A padding 17 of rubber or other suitable material is placed between the plate 15 and cover 16 to further shape and cushion the saddle. A tongue of metal 18 (Fig. 5) is struck downwardly from plate 15 adjacent the forward tip of the saddle to form the point of connection of the rear end of spring bar 6 to the saddle. A metal block 20 provided with an arcuate lower surface is secured to the tongue 18 by a bolt 19, a leather washer-like member 21 being interposed between block 20 and tongue 18.

The rear end of bar 6 is curved to conform to the curvature of the lower face of block 20 and is provided with a slot 22 in which the end of bolt 19 engages. The concave surface of the curved end of bar 6 is provided with pointed transverse ribs 23 engaging similar ribs 24 formed on the lower surface of block 20. A tubular member 25 provided with a squared head 26 passes through a flanged washer 27 and slot 22 into threaded engagement with the bolt 19 to clamp bar 6 rigidly in adjusted relation to the saddle.

The rear mounting 4 comprises a rod bent into U-shape, providing arms 30 and a cross portion 31. The cross portion 31 of the U-member is pivotally connected to the rear portion of the saddle by means of spaced clamps, each clamp comprising two opposed members 32 and 34 having one end curved to conform to the rod. The members 32 and 34 are adapted to be drawn together to engage the cross portion 31 and to secure the clamps to the saddle by bolts 35, passing through suitable openings formed in plate 15 of the saddle and the clamps, and provided with nuts 36. A reenforcing cross piece 37, formed with suitable openings adjacent its ends through which bolts 35 also pass, is positioned between the lower clamp members 34 and the nuts 36, lock washers 38 being interposed between the nuts and cross piece 37 if desired.

Resilient rubber bushings 39 are interposed between the cross piece 31 and the clamps to cushion the pivotal movement of the cross piece within the clamps, the latter being sufficiently tight so that minor pivotal movement takes place by distortion of the bushing while permitting movement of the cross piece within the bushing when substantial pivotal movement is called for.

Arms 30 telescope within tubular arms 40, connected at their upper ends by spaced cross bars 41 and 42, said cross bars being connected at their center portions by a web member 43, see Fig. 2. The lower ends of tubular arms 40 are interiorly threaded to receive bolts 45. The lower portions of arms 40 pass axially through heavy coiled springs 46, the lower ends of the springs being bent to form eyes 47 through which bolts 45 extend, to clamp the ends of the springs to the ends of the arms. Washers 48 are positioned between the ends of arms 40 and eyes 47 and between the latter and the heads of bolts 45.

The upper ends of springs 46 are bent into vertically positioned eyes 50 pivotally engaging over the ends of a rod 51 mounted in the spaced arms of a bracket 52 welded, or otherwise secured, to the bicycle frame. A spacing sleeve 53 is mounted on rod 51 intermediate the arms of bracket 52 to keep the latter properly spaced and to receive the thrust of nuts 54 which are threaded on the ends of rod 51 and hold eyes 50 in position on the rod.

The arms 30 are held in adjusted position in tubular arms 40 by a spring toggle clamp comprising bowed spring member 60 positioned between cross bars 41 and 42 with its ends projecting through slots 61 formed in the tubular arms 40 and into grooves 62 formed in the arms 30. The member 60, of spring leaf metal, is provided at its center with an opening 63 through which passes the free end of a stud 64 secured to web 43. The length and curvature of member 60 is such that normally its ends do not engage the bottoms of grooves 62, as shown in Fig. 8, so that the arms 30 may be moved within tubular arm 40 to desired adjusted position. The ends of member 60 are brought into forcible engagement with the bottoms of grooves 62 to clamp the arms 30 and 40 in adjusted position, see Fig. 7, by a hand nut 65 threaded on the end of stud 64, the advance of the nut on the stem tending to straighten the spring member 60 in the manner of a toggle. Any tendency of the ends of member 60, when in clamping position to slip on the bottom faces of grooves 62, is minimized by shaping the ends of member 60 in the form of a plurality of upwardly inclined teeth 66.

As will be evident, the weight of the rider is carried by springs 46 and downward or upward movement of the saddle takes place as a pivotal action around bolt 12 as a pivot, accompanied by pivotal movement of cross piece 31 in its clamps and eyes 50 about rod 51. The length of member 6 to which is added the length of the saddle reduces the period of oscillation of the saddle as the springs 46 act to cushion the road shocks.

It will further be seen that the height of the saddle, as well as its angular position with respect to the frame, can be easily and quickly adjusted by hand nut 65 which is accessibly positioned. Further angular adjustment may be made by varying the position of block 10 with respect to the arcuate face of the rear end of member 6 which also affords a small fore and aft adjustment. If greater fore and aft adjustment is needed than is provided by slot 22 the clamp 9 may be repositioned on bar 10 of the frame.

The improved riding qualities in a bicycle, due to a saddle construction as described or its equivalent construction, will be partly apparent from the description. But the real and best impression of the improvement is obtained by riding the same bicycle with prior art saddles and then with the one of this invention. The various features of improvement in the saddle are pointed out in the following claims.

I claim:

1. In combination a saddle and means for attaching it to a bicycle frame, which comprises a bar adjustably connected at one end to the saddle and hinged at the other end to the bicycle frame to permit bodily movement of the saddle through an arc, spring means pivotally connected between the frame and saddle for limiting the extent of said arcuate movement and supporting at least the major portion of the weight imposed upon the saddle and means interposed between the spring means and the saddle to provide adjustment for the height and angularity of the saddle.

2. In combination a saddle and means for attaching it to a bicycle frame, comprising a pair of arms pivoted to the rear portion of the saddle, tubular members into which said arms telescope, means to simultaneously clamp both arms in adjusted position within the tubular members, springs connecting the tubular members to the frame of the bicycle and a bar pivotally connecting the forward portion of the saddle to said frame.

3. In combination a saddle and means for attaching it to a bicycle frame, which comprises, a pair of arms pivoted to the rear portion of the saddle, tubular members into which said arms telescope, a cross piece connecting the upper end portions of the tubular members, openings in the tubular members adjacent the ends of the cross piece, a bowed spring toggle member having its ends engaged in said openings, means carried by the cross member adapted to straighten the spring toggle to cause its ends to engage said arms within the tubular member and clamp them in adjusted position, coiled springs surrounding the tubular members, the lower ends of the springs being connected to the ends of the tubular members, means pivotally connecting the upper ends of the springs to the bicycle frame, a bar having one end adjustably secured to the saddle and means pivotally connecting the other end of the bar to the bicycle frame at a point forwardly of the saddle.

THOMAS I. DUFFY.